(No Model.)

A. A. TAUBENECK.
ANIMAL TRAP.

No. 348,703. Patented Sept. 7, 1886.

WITNESSES:
C. Neveux
C. Sedgwick

INVENTOR:
A. A. Taubeneck
BY Munn & Co.
ATTORNEYS.

UNITED STATES PATENT OFFICE.

ARVOR A. TAUBENECK, OF MARSHALL, ILLINOIS.

ANIMAL-TRAP.

SPECIFICATION forming part of Letters Patent No. 348,703, dated September 7, 1886.

Application filed May 7, 1886. Serial No. 201,436. (No model.)

*To all whom it may concern:*

Be it known that I, ARVOR A. TAUBENECK, of Marshall, in the county of Clark and the State of Illinois, have invented a new and Improved Animal-Trap, of which the following is a full, clear, and exact description.

The object of my invention is to provide a new and improved animal-trap adapted for entrapping ducks, geese, and other fowl.

The invention consists of a trigger engaging the bell-crank lever held in a locked position by the jaws operated by means of the spring, in the usual manner.

The invention also consists of various parts and details and combinations of the same, as will be fully described hereinafter, and then pointed out in the claims.

Reference is to be had to the accompanying drawings, forming a part of this specification, in which similar letters of reference indicate corresponding parts in both figures.

Figure 1:
Figure 1:
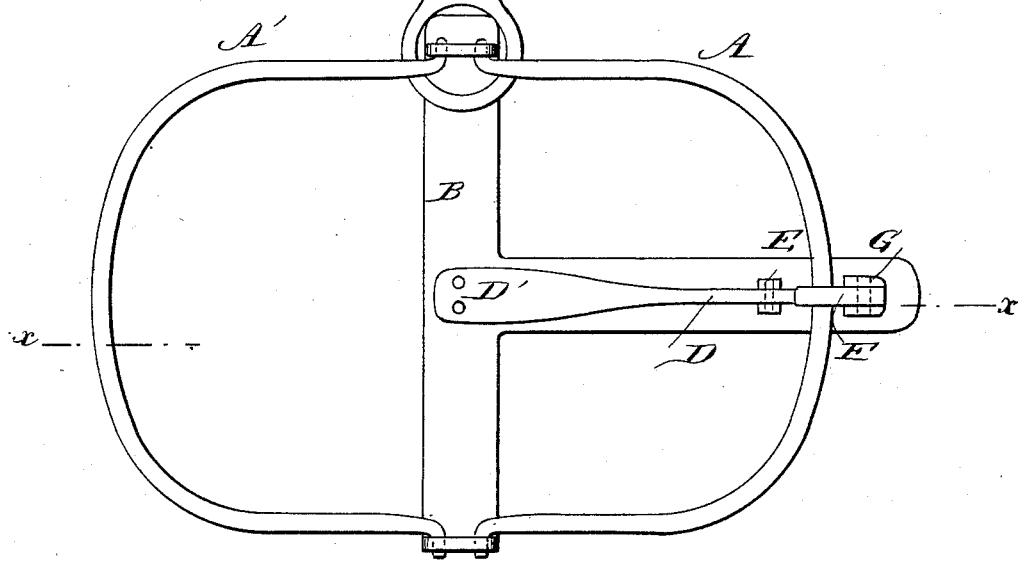
Figure 2:
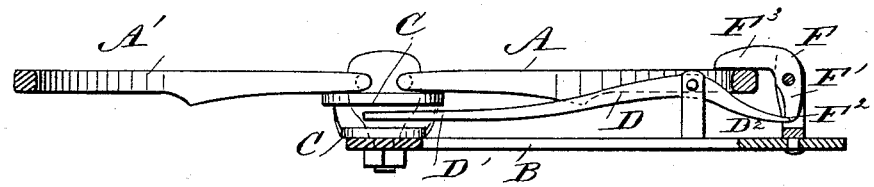

Figure 1 is a plan view of my improvement, and Fig. 2 is a vertical cross-section of the same on the line $x\,x$, Fig. 1.

In traps, as heretofore constructed, the animals step on the trigger carrying the bait and thus disengage the catch, so that the jaws close and entrap the animal. Wild ducks, geese, and other fowl cannot be successfully caught with such a trap, as they try to pull with their beaks on the bait attached to the trigger, and such upward pressure on the trigger does not release the catch holding the jaws. With my present invention such fowls are easily entrapped when they pull with their beaks on the bait. The jaws A and A' are pivoted on the T-frame B, and are operated on by the spring C, engaging the jaws in the usual manner. The trigger D is pivoted on the bearing E, secured to the arm of the frame B, and its inner end, D', which carries the bait, reaches to the center of the jaws A A' when the same are opened. The outer and downwardly-curved end $D^2$ of the trigger D engages with a notched shoulder, $F^2$, on the arm $F'$ of the bell-crank lever F, pivoted on the standard G, secured to the frame B. The outer end of the upper or horizontal arm, $F^3$, of the bell-crank lever F engages with the upper edge of the jaw A when the trap is set, which is done by pressing on the spring C, so that the jaws A and A' assume a horizontal position, as shown in the figures, and one of the jaws is placed with its upper edge under the horizontal arm $F^3$ of the bell-crank lever F, so that the notched shoulder $F^2$ engages with the outer end, $D^2$, of the trigger D, and thus locks the bell-crank lever F in place, and also holds the jaws A and A' open. It will be seen that a downward pressure on the trigger D will not release the bell-crank lever F, but the slightest lifting of the inner end, D', of the trigger D releases the outer end of the same from the notched shoulder $F^2$ of the bell-crank lever F, so that the jaws A and A' will close by the action of the spring C. Thus when the trap is set, and to the inner end, D', of the trigger is secured the necessary bait, as soon as the fowl picks at the bait and tries to pull the same upward the outer end of the trigger D disengages the notched shoulder $F^2$ of the bell-crank lever, and the jaws A and A' will fly shut and the animal will be entrapped.

Having thus fully described my invention, I claim as new and desire to secure by Letters Patent—

1. In an animal-trap, the combination, with a frame and spring-jaws pivoted thereto, of a bell-crank lever pivoted to the frame outside of one of the jaws when opened, and a pivoted trigger having its outer end engaging the lower end of the bell-crank lever, substantially as herein shown and described.

2. In an animal-trap, the combination, with the frame B, the pivoted jaws A, and the spring C, of the bell-crank lever F, having the lower end of one of its arms notched, as at $F^2$, and the trigger D, having its outer end engaging the notch of the bell-crank lever, substantially as herein shown and described.

ARVOR A. TAUBENECK.

Witnesses:
   THOMAS W. CLARK,
   ARCHER BARTLETT.